Nov. 3, 1936.                    C. H. JOHNSON                    2,059,950
                             ROAD SANDING MECHANISM
                   Filed Feb. 6, 1936            3 Sheets-Sheet 1
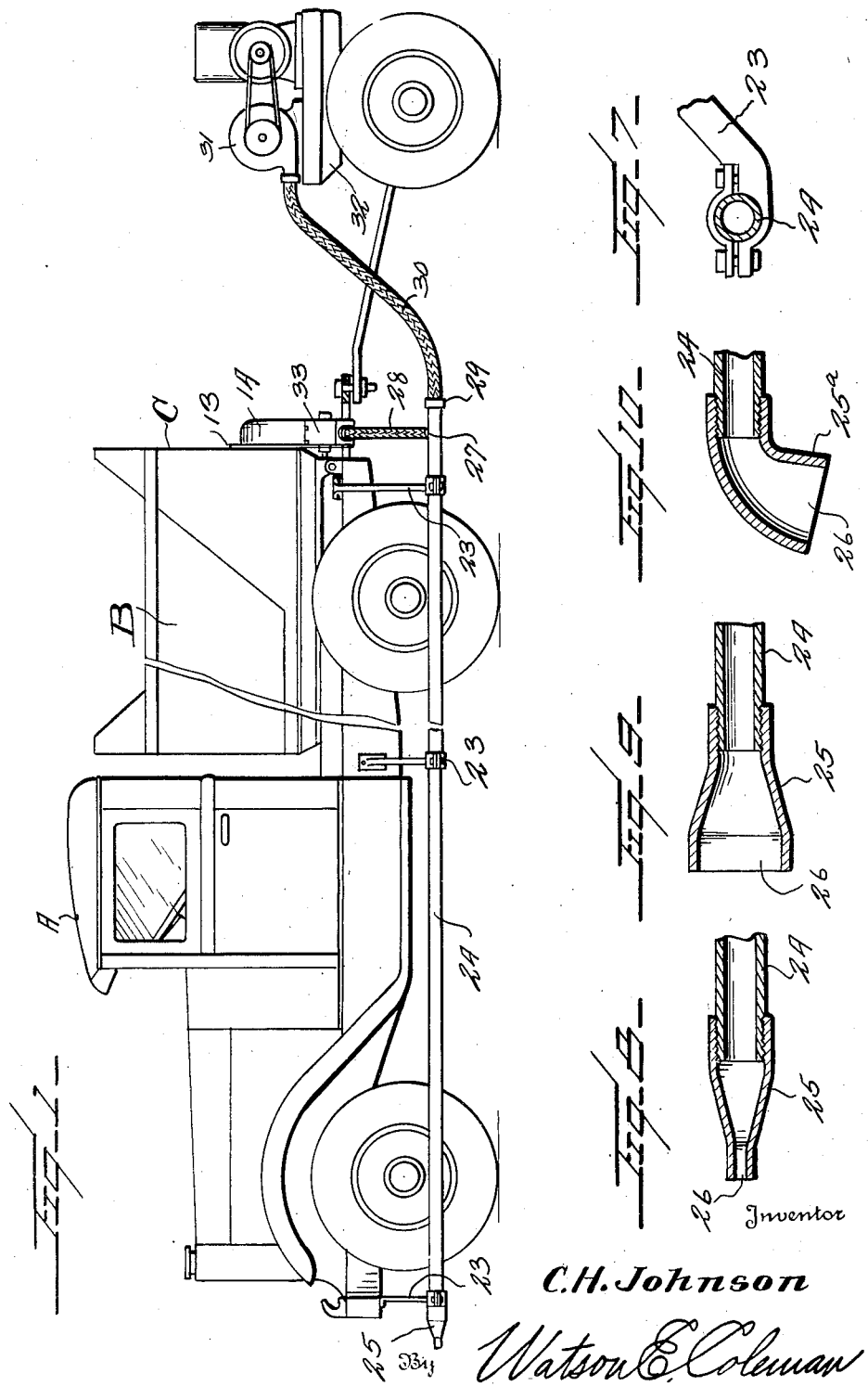
Inventor
C. H. Johnson
Watson E. Coleman
Attorney Nov. 3, 1936.  C. H. JOHNSON  2,059,950
ROAD SANDING MECHANISM
Filed Feb. 6, 1936  3 Sheets-Sheet 2
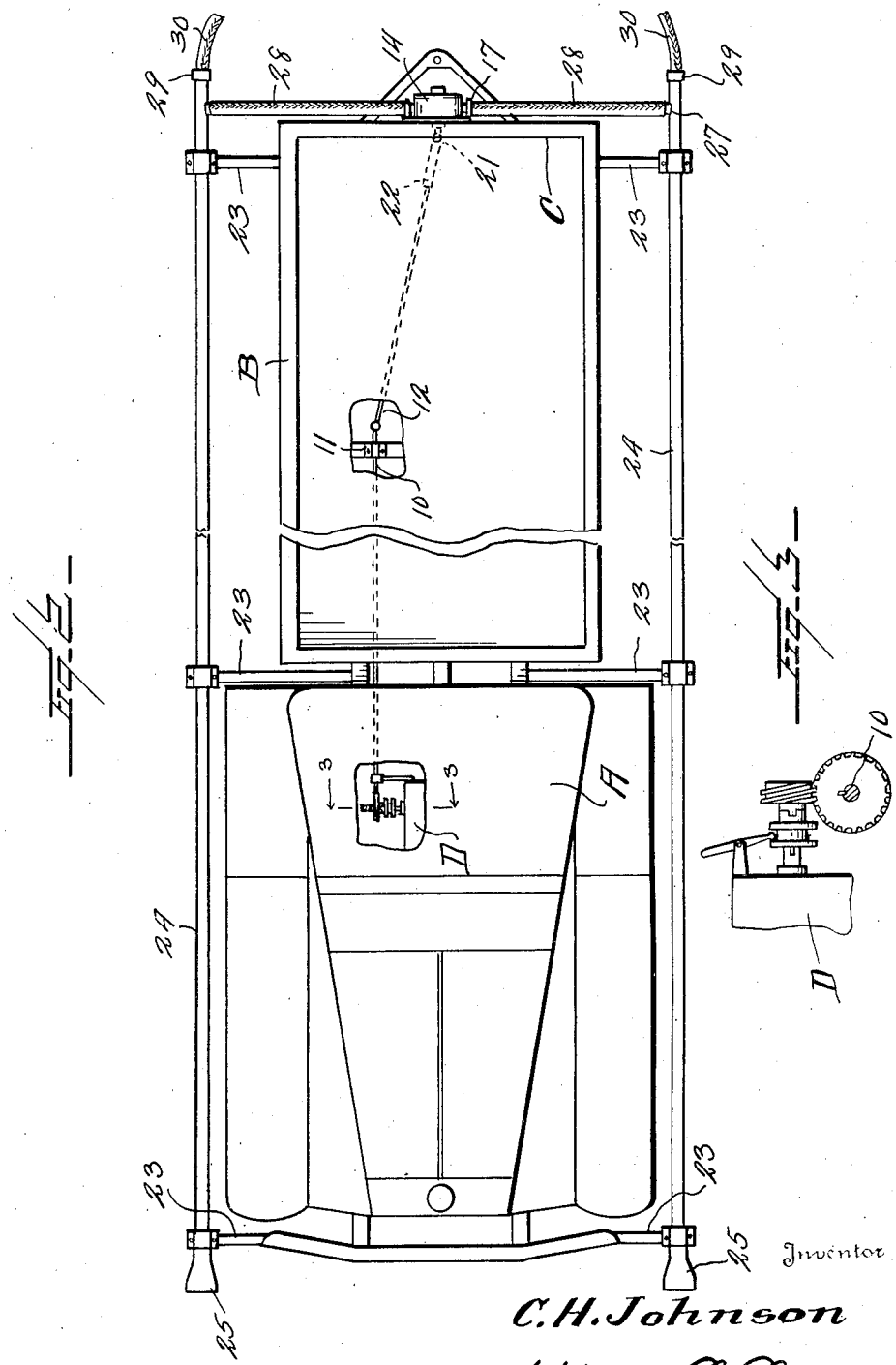
Inventor
C. H. Johnson
By Watson E. Coleman
Attorney Nov. 3, 1936.  C. H. JOHNSON  2,059,950
ROAD SANDING MECHANISM
Filed Feb. 6, 1936  3 Sheets-Sheet 3
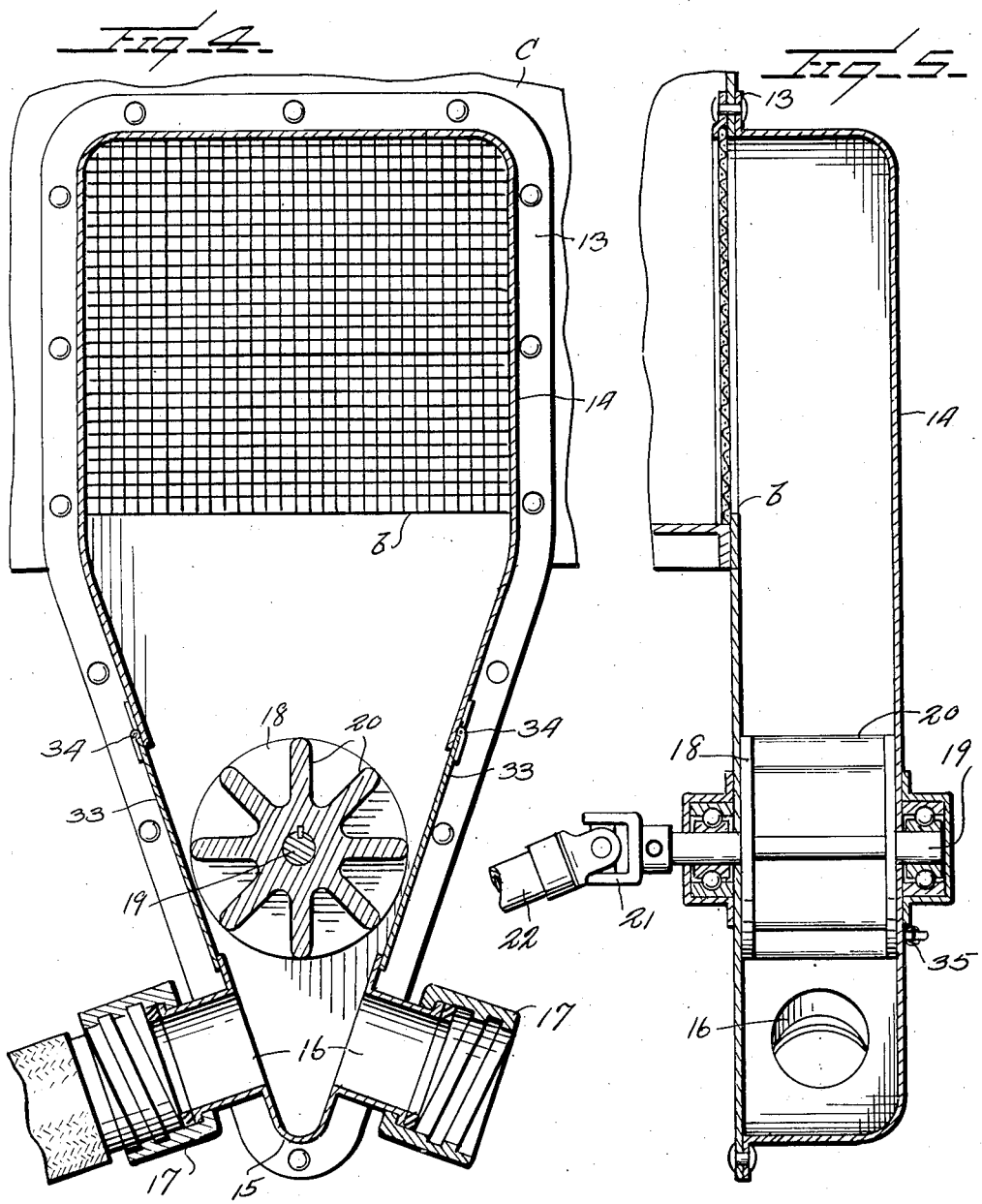
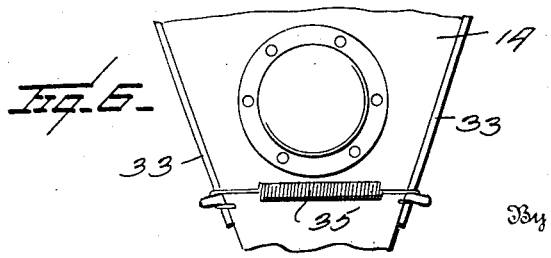

Patented Nov. 3, 1936

2,059,950

UNITED STATES PATENT OFFICE 2,059,950

ROAD SANDING MECHANISM

Carl H. Johnson, Duluth, Minn.

Application February 6, 1936, Serial No. 62,705

5 Claims. (Cl. 275—2)

This invention relates to road sanding devices and particularly to a motor truck carried means for discharging sand or like material upon a road surface.

One object of the invention is to provide a structure of this character in which sand or like material carried in a truck body is discharged steadily and evenly therefrom by the use of a rotatable, radially bladed motor driven distributor.

Another object is to provide an attachment which may be readily mounted upon an ordinary motor driven truck for this purpose.

A further object is to provide means whereby the material may be discharged either immediately in front of the truck or laterally therefrom.

A still further object is to provide means whereby the sand or other material may be discharged by air pressure, and in this connection, to provide a trailer which carries an air compressor, the air compressor being operatively connected to the sand distributing pipes on the motor driven truck.

Other objects will appear in the course of the following description.

My invention is illustrated in the accompanying drawings wherein:

Figure 1 is a side elevation of a truck and trailer fitted with my sanding mechanism;

Figure 2 is a top plan view of the truck, the parts partly broken away;

Figure 3 is a fragmentary elevation showing a form of power take-off on the engine;

Figure 4 is a vertical transverse section through the distributor casing, the distributor being shown in section;

Figure 5 is a vertical sectional view through the middle of the distributor casing, the distributor being shown in elevation;

Figure 6 is a fragmentary elevation of the lower portion of the casing showing the means for holding the doors closed;

Figure 7 is a fragmentary sectional view through one of the longitudinal discharge pipes showing the supporting bracket therefor;

Figure 8 is a vertical section through a forwardly discharging nozzle;

Figure 9 is a horizontal section therethrough;

Figure 10 is a sectional view showing a side discharge nozzle.

Referring to the drawings, A designates generally a motor driven truck of any suitable character having a pivoted body B, which is adapted to be hoisted at its forward end to provide for the discharge of sand towards its rear end. The rear end of the truck is provided with an end gate C. I have not attempted to illustrate any particular hoisting means, as this forms no part of my invention. The engine or the motor is provided with a power take-off D and leading from this power take-off is a driveshaft 10 mounted in suitable bearings in the chassis of the truck and connected by a universal joint 11 to a shaft section 12 extending rearward to a point opposite the middle of the end gate C.

Mounted upon the middle of the end gate C is a distributor casing. This casing, which is designated 14, is provided with the marginal flanges 13, whereby it may be attached to the end gate. The casing 14 has a relatively wide upper portion communicating, through the end gate C, with the interior of the body B, the bottom of the truck body being designated b in Figure 4. All that portion of the casing 14 disposed above this bottom b is in communication with the body B. Below the bottom b of the dumping body B, the casing 14 is laterally contracted or is substantially triangular in shape, the side walls extending downward and inward and meeting at 15. Just above the extreme lower portion 15 of the casing there are formed two outlet nipples 16 having couplings 17 connected therewith. Disposed within the triangular lower portion of the casing 14 and below the bottom b of the dump body, there is a rotating radially bladed distributor 18. This is mounted upon a shaft 19, the shaft being preferably mounted upon ball bearings. The distributor is provided with radial blades 20 and is shown as rotating in a clockwise direction in Figure 4. The shaft 19 is connected by a universal joint 21 with a sleeve 22 that has telescopic engagement with the shaft section 12 but is rotated thereby. This universal and sliding joint thus formed permits the dump body to be inclined at any desired angle and yet permits the shaft 10 to have operative engagement at all times with the shaft section 12 and permits the shaft section 12 to have operative engagement at all times with the shaft 19.

Mounted on downwardly and outwardly extending brackets 23 carried by the frame of the truck are the two longitudinally extending pipes 24, these pipes being disposed on a level slightly below the hubs of the truck wheels, as shown in Figure 1. The forward end of each pipe 24 is provided with a discharge nozzle 25 which may be of any suitable form. The discharge nozzle 25 illustrated in Figures 8 and 9 is slightly flared at its forward end laterally but has a discharge opening 26 in its end face, so that sand or other material discharged through the pipes 24 will be discharged downward in front of the truck wheels.

If it be desired to discharge the sand laterally in a sheet across the face of the roadway, angularly extending nozzles 25a may be provided in place of the nozzles 25, which will discharge the sand or other material outward and downward laterally of the truck and distribute this sand over the face of the roadway on each side of the path of travel of the truck. The rear ends of the pipes 24 are provided with hose connections 27 and from each coupling 17 a flexible hose 28 extends downwardly and laterally and engages with the hose connections 27 whereby sand discharged from the distributor discasing 14 will pass downward in two streams into the rear ends of the discharge pipes 24. The discharge pipes 24 at their extreme rear ends are provided also with hose connections 29 whereby the rear ends of these pipes may be connected by means of the hose 30 to an air compressor 31 mounted upon a trailer truck 32, this compressor being driven by any suitable motor or being driven by the wheels of a truck. By this means the sand or other material as it passes from the distributor 14 to the rear ends of the pipes 24, is forcibly driven along these pipes and forcibly driven out of the discharge nozzles 25 or 25a. If the distributor 18 is not rotating, no sand or other material will pass from the truck body to the branch pipes 28. Hence it is desirable to provide a clutch preferably connected with a power take-off D whereby the distributor may be held from rotation while the truck is traveling to the point where it is desired to distribute the sand and whereby the distributor may be operatively connected to the power take-off when it is desired to sand the roadway. Preferably the downwardly converging side walls of the casing 14 are provided with the doors 33, these being hinged at 34. These doors are urged to a closed position by means of a single spring 35 which is operatively connected to the lower ends of the doors. The purpose of these doors is to permit the passage of stones or other relatively large bodies out of the casing when they are carried downward and lodged between the rotating distributor 18 and the side walls of the casing, such stones otherwise preventing or obstructing the free rotation of the distributor and possibly causing breakage. By the provision of these safety doors 33, however, any relatively large bodies like this will be discharged out of the casing and will not pass down into the lower end of the casing or into the nipple 16 and so obstruct the free passage of sand to the discharge pipes.

It will be seen that the material such, for instance as sand, passes down through the pipes 28, partly by force of gravity and partly from the pressure of the material being forced into these pipes and through them by the rotatable distributing member 18, but this material is further caused to be drawn through these pipes 28 by the suction produced by the air blasts passing through the pipes 24, these blasts of air causing the material in the pipes 28 to be sucked downward. Under these circumstances, no sand obstruction can form within the branch pipes 28.

While I have heretofore referred to screened materials such as sand, gravel, etc., comminuted calcium chloride may also be distributed, and the motor dump truck with this equipment, when loaded with screened sand or fine gravel, may be used to sand slippery streets, roads or sidewalks or to lay an even layer of sand over a newly oiled or tarred road surface, and when the truck is loaded with calcium chloride, it may be used to spread an even layer of this material over dusty road surfaces. With this invention, the road surfacing material being used may be delivered under air pressure either at the front or to the side of the truck at any angle desired in a spray spreading an even layer of the material used while the motor truck is in motion. By means of the rotatable distributor 18, the amount of material being spread is regulated, thus when the motor dump truck is traveling at a relatively high rate of speed, the distributor will rotate at a higher rate, causing a heavier flow of material through the blower pipe. Thus the material will be spread as evenly when the truck is traveling at a relatively high speed as it will when the truck is traveling at a relatively low speed. Thus this distributor 18 not only acts as a governor to control the amount of material discharged according to the speed of the motor dump truck, but also tends to act as a breaker of the material being used that may have become congealed by reason of frost, moisture, or other causes. The structure which I have described will spread efficiently all grades of sand chips up to quite heavy gravel, as well as spreading calcium chloride or similar comminuted or granular substances.

The rotating distributing member 18 is very essential to the efficient operation of a road surfacing or sanding machine of this type:

First, because such a distributor is needed to regulate the flow of material according to the speed of the truck so as to secure an even coat or layer of material to be spread regardless of the speed at which the truck is operated;

Second, because such a bladed distributor acts to break up the surfacing material tending to pulverize any material that may have been congealed into lumps by frost, moisture or other reasons, and Third, because such a distributor tends to force the road surfacing material through the lower part of the distributor casing and out through the hose 28 to the discharge pipes, adding this force feed to the force of gravity so that a positive flow of material is assured, this positive flow being further assured by the syphonic action caused by the air blasts entering the rear ends of the discharge pipes 24.

I mount the air blower or air compressor on a trailer because to have such an air blower or compressor mounted on the truck with an air pressure delivery would be rather costly to produce, operate and maintain. By using a blower or air compressor mounted on the trailer, the trailer may be connected to any truck equipped with my distributing mechanism and equipped with a towing hitch.

It will be noted that my mechanism includes two rigid discharge pipes 24 or blower pipes mounted on either side of the truck chassis. The advantages of this arrangement are that a greater spread of road surfacing material is possible. Such arrangement allows for more clearance to take care of any irregularities in the road bed, and being of a rigid construction and mounted on the chassis, there is provided a clear passage for the material being driven out of the discharge nozzles under air pressure. These rigid discharge pipes are not subject to "buckling" and to vibration as would flexible hose affixed to the feed end of the machine or to the front axle. It is proposed in sanding highways to use two or more trucks of this type and perhaps have one trailer which can be attached to and detached from the truck easily and quickly.

I do not wish to be limited to any particular compressor as this may have the form of a blower or the form of an air pressure tank connected to an air pump. I have illustrated, however, a blower for this purpose driven by a motor.

While I have illustrated a particular form of truck, it is to be understood that any suitable truck may be used and that my invention may be applied as an attachment to any ordinary form of dump truck.

I do not wish to be limited to the details of construction except as defined in the appended claims.

Any type of detachable nozzle 25 suitable for spraying sand, fine gravel, or calcium chloride may be used, so that my mechanism may be used to lay a sheet of material either entirely across the roadway immediately in front of the truck, or across in front of the wheels, or to the side of the truck, depending entirely on the type of nozzle put to use.

While I have shown a wire netting as disposed in the opening of the casing 14, it is to be understood that this netting in the majority of cases will be absent. It is only used for the purpose of preventing sticks, trash and other objects which might clog the casing, from entering the same.

What is claimed is:—

1. A road sander including a dump truck having a tiltable dump body and having a motor, longitudinally extending discharge pipes carried by the truck on each side thereof and below the body and having discharge nozzles at their forward ends, a distributor casing mounted upon the rear end of the truck and communicating with the interior thereof, the casing being contracted toward its lower end, a rotatable radially bladed distributor mounted within the lower end of the casing and operatively connected to the motor to be driven thereby, branch pipes extending in opposite directions from the lower end of the casing below the distributor and discharging downward and laterally into the rear ends of the discharge pipes, and means for discharging air under pressure into the rear ends of said discharge pipes.

2. A road sander including a dump truck having a tiltable dump body and having a motor, longitudinally extending discharge pipes carried by the truck on each side thereof and below the body and having discharge nozzles at their forward ends, a distributor casing mounted upon the rear end of the truck and communicating with the interior thereof, the casing being contracted toward its lower end, a rotatable radially bladed distributor mounted within the lower end of the casing and operatively connected to the motor to be driven thereby, branch pipes extending in opposite directions from the lower end of the casing below the distributor and discharging downward and laterally into the rear ends of the discharge pipes, means for discharging air under pressure into the rear ends of said discharge pipes, said means comprising a trailer drawn by the truck, a blower mounted upon the trailer, and pipes leading from said blower to the rear ends of the discharge pipes.

3. A road sander including a dump truck having a tiltable dump body, a motor mounted upon the truck in advance of the dump body and having a power take-off, a shaft leading rearward from the power take-off and having a universal joint in its length, a distributor casing mounted upon the rear end of the body and communicating with the interior thereof and having a downwardly contracted portion disposed below the floor of the truck, a radially bladed distributor mounted in said contracted portion and having a shaft, a shaft being connected to the first named shaft by means of a slip joint and a universal coupling, discharge pipes carried upon the truck below the body and on each side thereof, the forward ends of the discharge pipes having distributing nozzles, pipes connecting the lower end of the distributing casing below the distributor with the rear ends of said discharge pipes, and means for discharging air under pressure into the rear ends of said discharge pipes.

4. A road sanding attachment for motor operated dump trucks including a distributor casing adapted to be attached to the rear end wall of the truck, the upper end of the casing opening through said end wall, the lower end of the casing being contracted, a radially bladed distributor mounted within the lower end of the casing and having a shaft, means for operatively connecting the said shaft to the motor of the truck, a pair of discharge pipes, means for supporting said pipes on each side of the truck, discharge nozzles at the forward ends of the pipes, flexible hose connecting the lower end of the casing to the rear ends of said discharge pipes, a blower adapted to be mounted upon a trailer and flexible hose extending from the blower to the rear ends of each of the discharge pipes.

5. In a road sander of the character described, a distributor casing adapted to be applied to the rear end of a dump truck and receive material therefrom, the lower end of the casing being downwardly and centrally contracted and having opposed doors hinged at their upper ends to said casing, means yieldingly holding said doors closed, pipes leading in opposite directions from the lower end of said casing below the doors, and a motor operated radially bladed distributor mounted within the casing between said doors, the periphery of the distributor closely approximating the inner faces of said doors.

CARL H. JOHNSON.